United States Patent
Robertson

[15] 3,665,572
[45] May 30, 1972

[54] ROLL WITH BEARING SUPPORT MEANS

[72] Inventor: J. Douglas Robertson, Taunton, Mass.

[73] Assignee: Mount Hope Machinery Company, Taunton, Mass.

[22] Filed: Oct. 16, 1970

[21] Appl. No.: 81,272

Related U.S. Application Data

[63] Continuation-in-part of Ser. No. 875,865, Nov. 12, 1969, abandoned.

[52] U.S. Cl.....................................................29/116 AD
[51] Int. Cl.......................................................B21b 13/02
[58] Field of Search...................29/116 R, 116 AD, 125, 127

[56] References Cited

UNITED STATES PATENTS

| | | |
|---|---|---|
| 2,152,561 | 3/1939 | Nigra...............................29/116 R X |
| 2,356,010 | 8/1944 | Seymour..........................29/116 R X |
| 2,771,658 | 11/1956 | Morrill............................29/116 R X |
| 2,898,662 | 8/1959 | Robertson......................29/116 AD X |
| 3,094,771 | 6/1963 | Robertson......................29/116 AD X |
| 3,225,418 | 12/1965 | Fara...............................29/116 AD X |
| 3,328,866 | 7/1967 | Robertson..........................29/116 AD |

Primary Examiner—Alfred R. Guest
Attorney—Rich & Ericson

[57] ABSTRACT

A roll having a curved stationary axle carries a series of bearings which rotatably mount a roller sleeve. The bearings, which have to fit the axle loosely, are held firmly in place by an axial stack of annular spacer collars and axially-compressible spring spacers, which apply a controlled compression. Optionally, deformable cushioning rings are compressed against the bearings by the collars. The cushioning rings may be made of a material which is either compressible or incompressible; the spacers have expansion chambers at their ends to accommodate deformation of the rings if these are incompressible.

21 Claims, 10 Drawing Figures

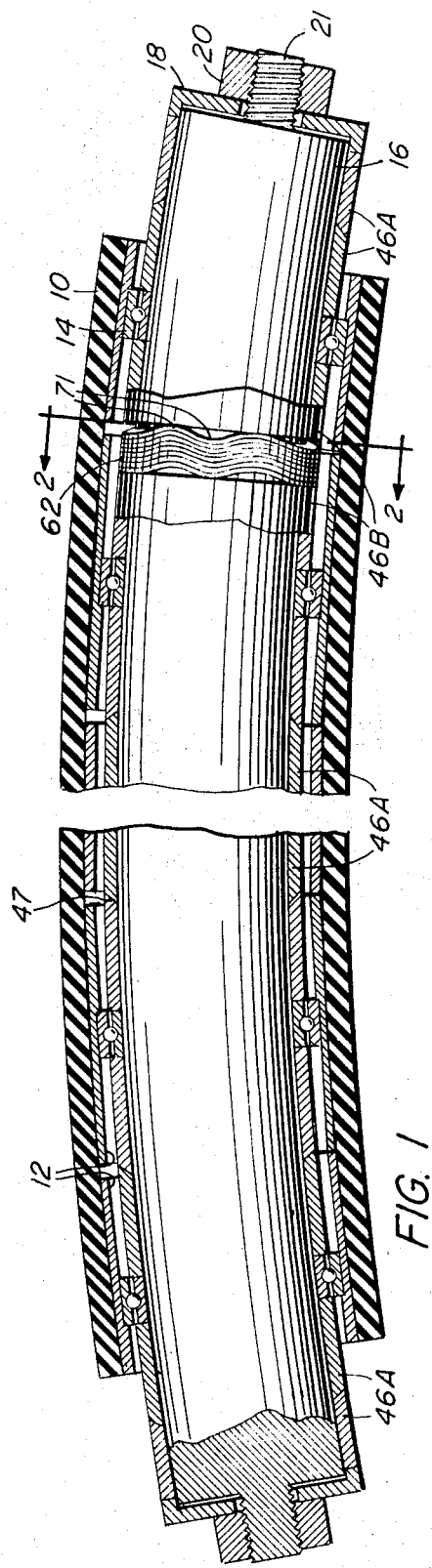
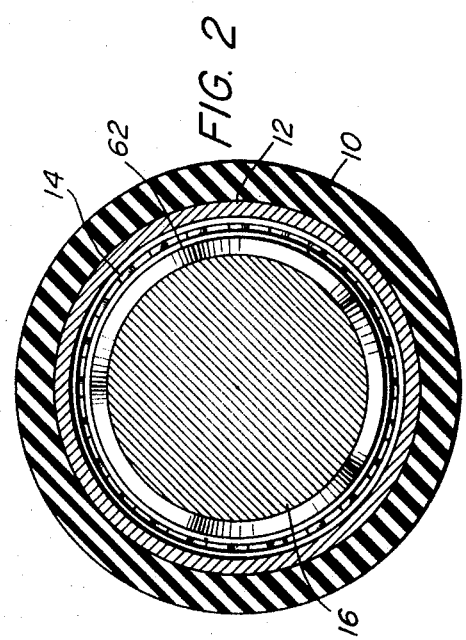

PATENTED MAY 30 1972 3,665,572

Inventor
J. DOUGLAS ROBERTSON
by Thomson, Mrose & Ericson
Attorneys

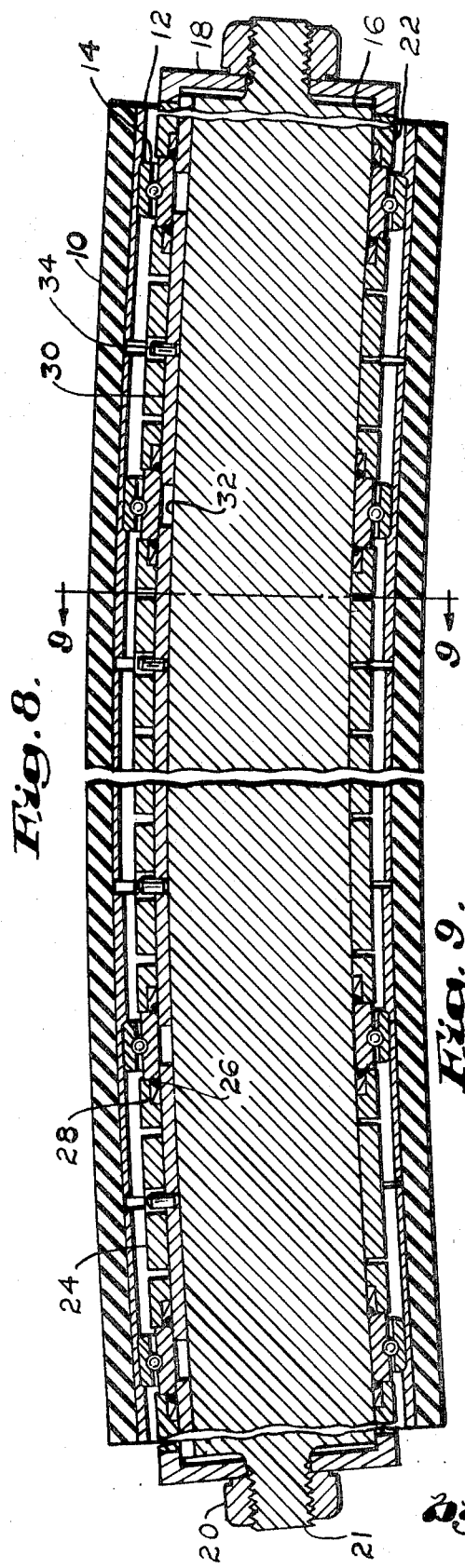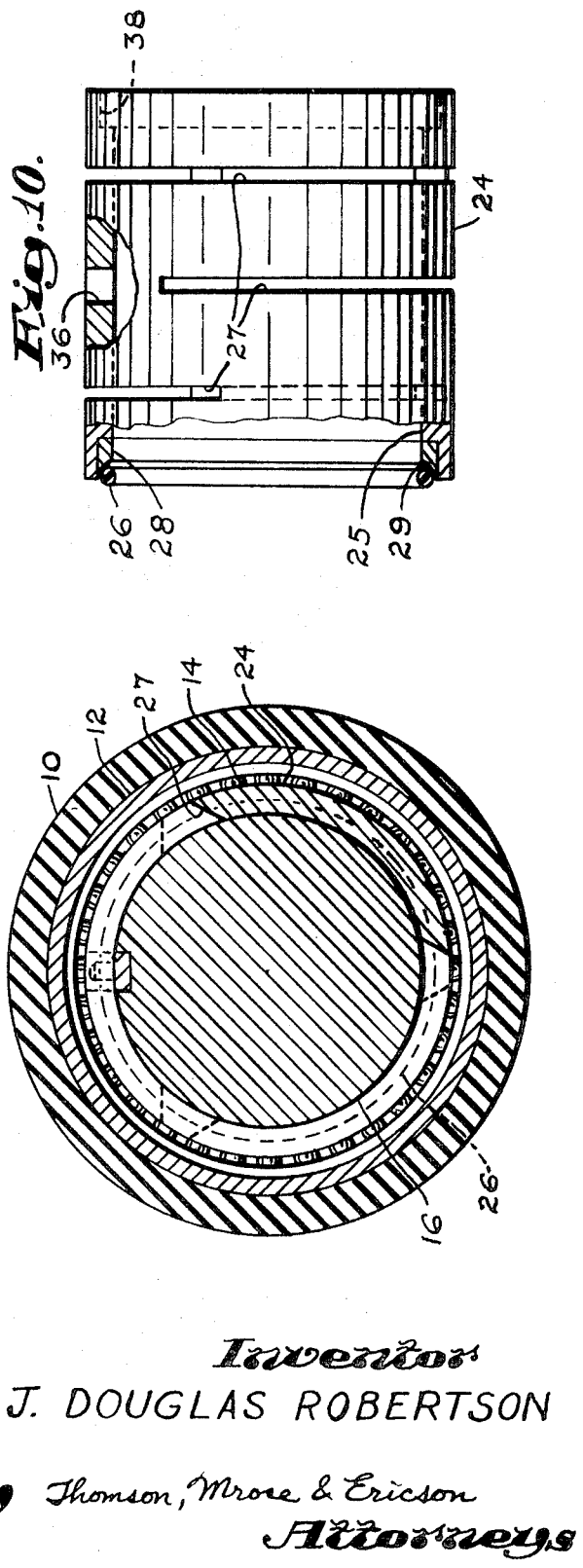

ROLL WITH BEARING SUPPORT MEANS

BACKGROUND AND BRIEF DESCRIPTION OF THE INVENTION

The present application is a continuation-in-part of my copending application Ser. No. 875,865 filed Nov. 12, 1969 now abandoned.

Curved rolls are widely used for expanding all sorts of sheet and web materials laterally, and for straightening the weft threads of woven materials. In making these rolls, it is conventional and economically desirable to form the curved axles by bending straight bar stock into a curved form, without machining the material to obtain fine tolerances. A series of bearings are spaced along the curved axle to support the rotating sleeve of the roll. Both the rough mill tolerances of the stock and the curvature of the axle prevent sliding these bearings onto the axle from one of its ends, unless the bearings have a loose fit on the axle. Keys are used to prevent the inner races of the bearings from rotating, but the looseness of the bearings allows them to rattle against the axle as a result of normal roll vibration. This not only causes fretting, wear, and ensuing local corrosion of the axle, but the repeated shock to the bearings greatly shortens their useful life.

Annular cylindrical spacer collars, having parallel end faces, are used conventionally to locate the roll bearings. These collars compress the bearings substantially more on the concave face of a curved axle than on its convex face, and are not effective to protect the bearings from rattling. While it is theoretically possible to include the end faces of the spacers with respect to a true radial plane, so as to obtain uniform compression around the circumference of the bearings, this is generally not economically practical, because of the expense of machining inclined faces accurately, at an angle corresponding to the particular radius of curvature required for each individual axle.

It is the principal object of this invention to increase the life of bearings used in roll assemblies and to reduce damage to these assemblies caused by looseness of bearing support. It is another object to provide improved means for supporting bearings on the axle of a roll assembly, especially in a curved roll. Further objects and advantages of the invention will appear as the following description proceeds.

According to one embodiment of the invention, I provide a curved roll assembly with axially-compressible spring spacers, which curve to conform the opposite ends of cylindrical spacer collars to the relatively-inclined faces of adjacent bearings. This results in a moderate but acceptable circumferential variation in the compression applied to the bearings; there is a slightly higher compression at the concave side of the axle than at the convex side. I assemble these spring spacers on the roll axle from its ends in a stacked relation with the roll bearings and the spacer collars. The axially-stacked assembly of bearings, spring spacers, and spacer collars is compressed to a suitable degree by nuts threaded on opposite ends of the axle. This supports the bearing inner races firmly with respect to the axle, prevents the application of excessively large compression forces when the assembly is tightened, and maintains uniform compression as the parts wear in and seat themselves.

It is preferred to divide the annular spacer collars with self-aligning beveled joints, which allow the collar ends to assume the same inclination as the bearing faces. In combination with the spring spacers, this provides the most uniform circumferential compression of the bearings.

According to another aspect of the invention, the bearings may be engaged by deformable cushioning members, preferably in the form of rings of rubber or other elastomeric material. These cushioning members are compressed by the spacer collars to support the bearings firmly. While it is preferable to use them with spring spacers, this is optional. The material of the cushioning rings may be incompressible although deformable; and if spring spacer collars are not to be used, the spacer collars have their ends so formed as to afford expansion chambers to accommodate deformation of the cushioning rings. Otherwise, tightening up the assembly could pinch and damage the cushioning rings and even distort the bearing inner races, shortening bearing life. If the cushioning rings are made of a compressible material such as sponge rubber, however, it is not necessary to provide expansion chambers even though spring spacers are not used.

DESCRIPTION OF THE DRAWINGS

While the specification concludes with claims clearly pointing out the subject matter which I regard as my invention, it is believed that a clearer understanding may be gained from the following description of preferred embodiments, referring to the accompanying drawings, in which:

FIG. 1 is an axial cross-sectional view of a first form of roll assembly made in accordance with the invention;

FIG. 2 is a sectional end view taken along line 2—2 in FIG. 1, looking in the direction of the arrows;

FIG. 8 is an axial cross-sectional view of another form of the improved roll assembly;

FIG. 9 is a sectional end view taken along line 9—9 in FIG. 8, looking in the direction of the arrows; and FIG. 10 is a fragmentary view in side elevation of a collar and ring forming parts of the roll of FIG. 8.

Figure 3:
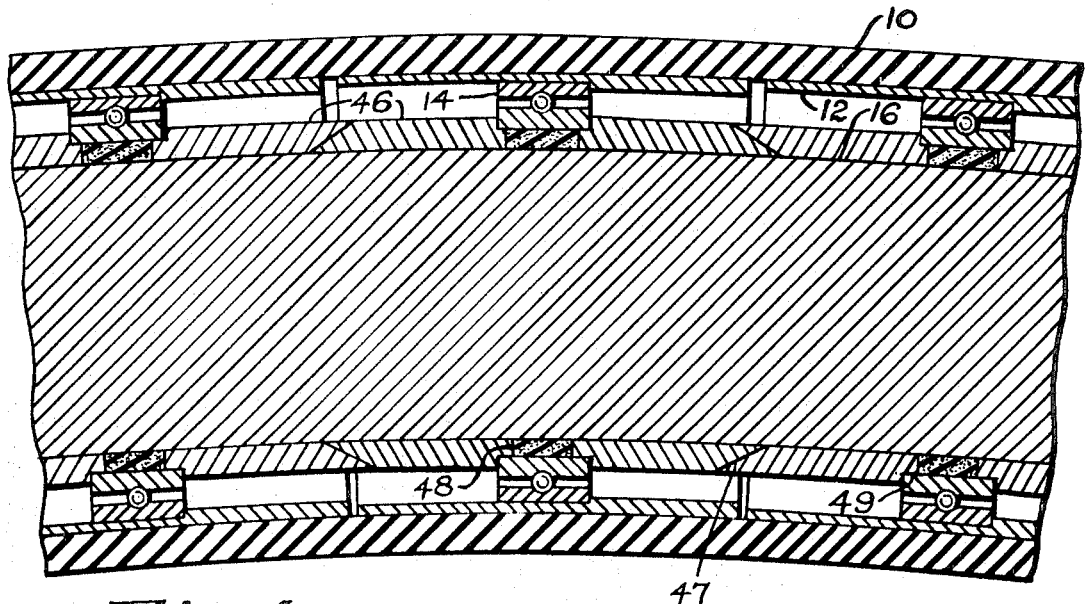
FIG. 3 is a fragmentary axial cross-sectional view of a modified roll assembly employing resilient cushioning rings.

Referring first to FIGS. 1–2, a first form of the improved roll assembly includes a longitudinally-curved cylindrical axle 16. The assembly supports an annular sleeve 10, of flexible material such as rubber, for rotation about its curved axis. The sleeve is supported over its full length by a series of annular spools 12, which are rotatably mounted on the axle 16 by a series of ball bearings 14 suitably spaced apart along the axle. Because of the curvature of the axle, as well as the desirability of using unmachined bar stock with rough mill tolerances in its dimensions, the inner races of the bearings must have a substantially larger diameter than the nominal diameter of the axle. The bearings are assembled on the axle by sliding them from its ends.

In the form shown in FIG. 1, the bearings 14 are axially abutted by a plurality of annular spacer collars 46A and 46B, which are slidably received on the axle in alternating relation with the bearings, and must also have a loose fit on the axle. The majority of the collars, designated 46A, are divided by beveled joints 47, which allow the end faces of the collars abutting the bearings to align themselves with the inner bearings races, substantially in contact around the complete periphery.

At least one axially-compressible spring spacer means, illustrated in the form of a stack of deformed annular rings 62, is received on the axle 16. These rings are interposed between a pair of spacer collars 46B which are formed with radial end faces for this purpose. The rings 62 are made of spring steel or the like, and are bent axially to form a series of circumferentially-spaced lobes 71, extending in alternate axial directions.

At either end of the assembly, a compression cap 18 engages an end-most one of the spacer collars 46A. The assembly of collars 46A and 46B, rings 62, and bearings 14 is axially compressible by tightening nuts 20, which are threaded on protruding end portions 21 at either end of the axle and bear on the caps 18. The compression force is proportionate to the axial compression of the stack of rings 62. Spring spacer means other than the rings 62 may be used to control the compression force applied by the nuts 20 in drawing the parts of the roll assembly together; for example, conventional helical compression springs may be substituted.

The stack of rings 62 constitutes an axially-compressible spring having a fairly large spring constant, typically about 30,000 pounds per inch. An axial contraction of the assembly of about 1/32 inch therefore applies a compressive load of approximately 1,000 pounds, which supports the bearings 14 firmly so that the inner races cannot rattle or rotate on the axle.

Considerable variation in the spring rate may be appropriate for particular applications. But a very low spring rate would require a greater movement of the nuts 20 to compress the rings 62 adequately; and a very high spring rate would tend to defeat the purpose of the springs in compensating for the elements seating themselves in initial use of the roll.

A modified assembly is shown in FIG. 3, in which the bearings 14 are additionally secured by deformable cushioning members 48, comprising rings of rubber or other elastomeric material, interposed between the bearings 14 and the axle 16. Parts similar to those of FIGS. 1 and 2 are numbered alike. The ends of the spacer collars 46 adjacent to the bearings 14 are formed with annular recesses 49, and extend inside the inner races of the bearings 14 to provide annular chambers for receiving the rings 45. If the rings are formed of an incompressible rubber, the axial length of each chamber is preferably such that the ring just fills the chamber and is subject to a moderate amount of compression when the assembly is tightened enough to the spacer collars 46 against the radial surfaces of the bearings. This imposes a moderate radial pressure outwardly against the inner races, and thus provides a further resilient restraint against rattling and vibration. The abutment of the collars 46 against the radial ends of the bearings prevents accidental excessive compression of the rings 45 by over-tightening of the nuts 20; too much radial pressure could distort the bearing races.

It is possible to omit axially-compressible spring spacers such as the rings 62 from those constructions which have deformable cushioning members such as the rings 45. However, this requires a careful tightening of the nuts 20 with a torque wrench to avoid excess compression of the rings and bearings by the spacer collars 46. Further, the metal-to-metal contact between the spacer collars and bearings, in the absence of resilient springs, will result in a loss of compression as the parts wear in, and the nuts 20 will require frequent readjustment to keep the bearings under the proper degree of restraint.

Figure 4:
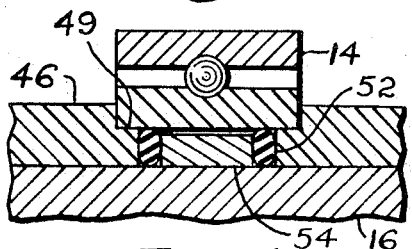
FIGS. 4, 5, and 6 are fragmentary axial cross-sectional views of several alternate forms of the cushioning rings.
Figure 5:
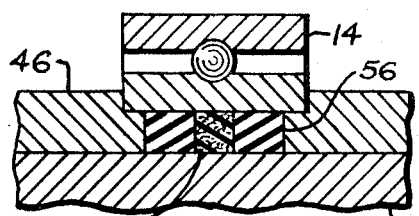
Figure 6:
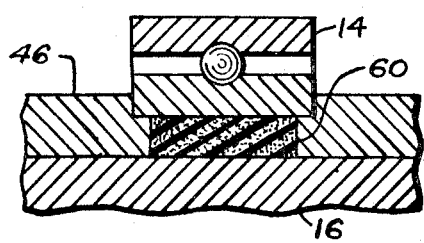

A number of variations may be made in the specific arrangement of the deformable cushioning rings and spacer collars. Three of these are shown in FIGS. 4, 5, and 6 by way of illustration. In FIG. 4, a pair of incompressible rubber rings 52 support each bearing 14, and are spaced apart and located by a metal ring 54. The rings 52 have a circular cross-section when uncompressed, but are shown deformed by the normal tightening of the assembly. The rectangular section of the ring chambers defined by the axial faces of the collars 46 and the ring 54, and the peripheries of the bearing 14 and axle 16, initially leave some expansion space around the rings 52. As these rings are deformed by axial compression, they assume a more nearly rectangular form, occupying a part of this expansion space. The parts are so dimensioned that the recesses 49 in the ends of the collars 46 abut against the bearing inner race before the expansion space is completely occupied. Thus the cushioning rings deform outwardly to grip the bearing firmly, but excessive tightening of the assembly cannot apply radial forces that might be great enough to distort the bearing race and shorten bearing life.

In FIG. 5, the need for expansion space for the cushioning ring is avoided by using a composite ring having two portions 56 of incompressible rubber, and an intermediate portion 58 of compressible material such as foam rubber or the like. The collars 46 are so dimensioned that they abut the radial faces of the bearings 14 before the foam rubber 58 is completely compressed.

In FIG. 6, a cushioning ring 60 is made entirely of compressible elastomeric material such as foam rubber. Again, because of the compressibility of the cushioning ring material, there is no highly critical or specific minimum limit to the volume of the ring chamber.

Figure 7:
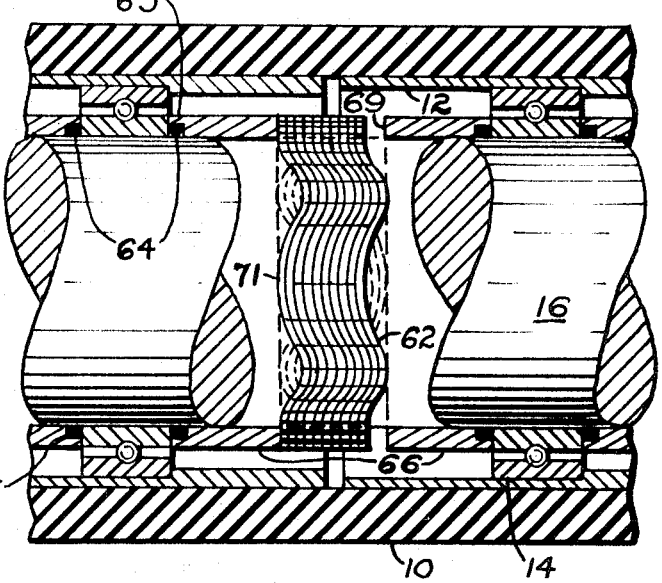
FIG. 7 is a fragmentary view in side elevation, and partially in cross-section, of a modification of the roll of FIGS. 1 and 2.

Another construction, which combines deformable cushioning members with spring spacers like those in FIGS. 1 and 2, is shown in FIG. 7. The assembly includes spacer collars 66, which have protruding lips 65 at their ends abutting radial surfaces of the bearings 14. These lips are defined by annular recesses 67 of non-circular section, cut into the inner peripheries of the collars 66 to receive cushioning rings 64 of incompressible rubber. The non-circular form of the recesses 67 allows expansion space for deformation of the rings 64. A stack of deformed annular rings 62 is received on the axle 16 between radial end faces 69 of the collars 66, and acts as a compression spring. When the assembly of bearings 14, collars 66, rings 62, and cushioning rings 64 is sufficiently compressed in an axial direction, the lips 65 engage the bearing inner races. The compression force is proportionate to the reduction in the length of the stack of rings 62.

Another embodiment is illustrated in FIGS. 8–10, in which both the stack of spring rings 62 and the spacer collars 46 or 66 are replaced by axially-compressible collars 24. Parts similar to those of FIGS. 1–7 are similarly numbered. Each collar 24 has a series of three radial slits or sawcuts 27, which extend through the major portion of the diameter of the collar. These slits are staggered circumferentially, each occupying an arc of about 250° in the illustrated construction; and they are axially spaced apart along the collar.

The bearings 14 are secured by a series of deformable cushioning means, which take the form of rubber or other elastomeric rings 26. Two such rings engage either axial face of each bearing inner race, and are resiliently compressed against the bearing by the spacer collars 24, which are assembled on the axle in alternating order with the bearings and rings as shown.

The collars 24 are held against rotation on the axle 16 by means of pins 34, each received through a hole 36 in a collar and engaged with a key 30, which is in turn received in a longitudinal keyway 32 milled into the axle.

At either end of the assembly, an un-slit annular spacer collar 22 is engaged, at an end protruding from the sleeve 10, by a compression cap 18. The entire assembly of collars 22 and 24, deformable rings 26, and bearings 14 is axially compressible by tightening nuts 20, which are threaded on protruding end portions 21 of the axle. The roll assembly is supported by suitable mounts of a conventional nature (not shown), which engage the end collars 22 where they protrude from the ends of the sleeve 10.

Because the deformable rings 26 are made of incompressible rubber or the like, it would not be unlikely that the nuts 20 could be tightened enough to pinch these rings severely, and perhaps distort the bearing inner races. Therefore, I provide each end of the collars 24, and the axially-inner ends of the collars 22, with expansion chambers 29 that are initially gapped away from the rings 26 in an axial direction. The expansion space is sufficient so that the rings do not entirely fill the chambers 29 before overlapping circumferential lips 38 at the ends of the collars abut the radial faces of the bearings 14. It is convenient to form the expansion chambers 29 by grinding arcuate recesses into the axial faces of separate ring members 28, which are received within the lips 38.

What I claim is:

1. A roll comprising, in combination: an axle, a series of bearings received about said axle and axially spaced apart therealong, roller means rotatably supported on said bearings, spacer means arranged along said axle between said bearings, at least one of said spacer means being axially-compressible, and means for compressing said spacer means against said bearings to hold said bearings firmly in place on said axle.

2. A roll as recited in claim 1, said axially-compressible spacer means comprising at least one annular disc bent to form lobes offset from the plane of the disc and circumferentially spaced thereabout.

3. A roll as recited in claim 2, said axially-compressible spacer means comprising a plurality of said bent annular discs arranged in a nested stack.

4. A roll as recited in claim 1, said axially-compressible spacer means comprising at least one annular spacer collar extending about said axle and having a series of circumferential slots extending partially through the diameter of said collar.

5. A roll as recited in claim 4, said slots being axially spaced apart and staggered about the circumference of said collar.

6. A roll as recited in claim 1, said spacer means further including a plurality of substantially incompressible annular spacer collars arranged along said axle in axially-stacked relation with said bearings and said axially-compressible spacer means.

7. A roll as recited in claim 1, said axle being longitudinally curved.

8. A roll as recited in claim 7, at least some of said spacer means being formed with mutually-engaging ball-and-socket joints whereby said spacer means are free to conform individually to the local curvature of said axle.

9. A roll as recited in claim 1, said compressing means adjustably engaging ends of said axle protruding axially from said roller means.

10. A roll as recited in claim 1, together with deformable cushioning means engaging said bearings, said compressing means being operable to compress said cushioning means against said bearings to assist in holding said bearings firmly in place on said axle.

11. A roll as recited in claim 10, said deformable cushioning means being formed of substantially compressible elastomeric material.

12. A roll as recited in claim 10, said deformable cushioning means being formed of substantially incompressible elastomeric material.

13. A roll as recited in claim 12, said spacer means comprising annular collar means providing expansion chambers to accommodate deformation of said cushioning means.

14. A roll as recited in claim 13, the axial ends of said annular collar means having annular recesses formed in inner peripheries thereof to receive said cushioning means, said recesses having greater cross-sectional area than said cushioning means and comprising said expansion chambers.

15. A roll as recited in claim 14, outer peripheries of said axial ends of said collar means surrounding said recesses comprising annular lips for axial engagement with said bearings, said lips being of a length to abut said bearings before said assembly has been compressed sufficiently to reduce the cross-sectional area of said expansion chambers to equal the cross-sectional area of said cushioning means.

16. A roll as recited in claim 10, said deformable cushioning means having both compressible and substantially incompressible portions.

17. A roll as recited in claim 10, said cushioning means comprising a plurality of annular rings surrounding said axle and each engaging one of said bearings.

18. A roll as recited in claim 17, two of said deformable rings abutting each of said bearings adjacent opposite axial ends thereof.

19. A roll as recited in claim 17, said deformable rings being at least partially interposed radially between said bearings and said axle.

20. A roll as recited in claim 10, said spacer means comprising annular collar means having axial ends formed with recesses receiving said cushioning means, said axial ends further being formed with lips protruding axially to abut said bearings.

21. A roll as recited in claim 10, said cushioning means comprising rings radially interposed between said bearings and said axle, axial ends of said spacer means abutting axial ends of said rings.

* * * * *